US009182885B2

(12) United States Patent  (10) Patent No.: US 9,182,885 B2
Rüscher et al.  (45) Date of Patent: Nov. 10, 2015

(54) METHOD AND ARRANGEMENT FOR THE OPERATION OF ELECTRICAL DEVICES

(75) Inventors: Gitta Rüscher, Planegg (DE); Claude Toussaint, München (DE)

(73) Assignee: Unify GmbH & Co. KG, Munich (DE)

( * ) Notice: Subject to any disclaimer, the term of this patent is extended or adjusted under 35 U.S.C. 154(b) by 1878 days.

(21) Appl. No.: 12/309,558
(22) PCT Filed: Jul. 24, 2007
(86) PCT No.: PCT/EP2007/057618
§ 371 (c)(1), (2), (4) Date: Jan. 22, 2009
(87) PCT Pub. No.: WO2008/012307
PCT Pub. Date: Jan. 31, 2008

(65) Prior Publication Data
US 2009/0289907 A1  Nov. 26, 2009

(30) Foreign Application Priority Data
Jul. 25, 2006 (DE) .................. 10 2006 034 415

(51) Int. Cl.
G06F 3/041 (2006.01)
G06F 3/048 (2013.01)
G06F 3/0482 (2013.01)

(52) U.S. Cl.
CPC .................. G06F 3/0482 (2013.01)

(58) Field of Classification Search
None
See application file for complete search history.

(56) References Cited

U.S. PATENT DOCUMENTS

| | | | | |
|---|---|---|---|---|
| 5,119,079 A * | 6/1992 | Hube et al. | ..... | 715/823 |
| 5,956,035 A * | 9/1999 | Sciammarella et al. | ...... | 715/815 |
| 6,073,036 A * | 6/2000 | Heikkinen et al. | ......... | 455/550.1 |
| 6,157,379 A * | 12/2000 | Singh | ............... | 715/866 |
| 6,400,996 B1 | 6/2002 | Hoffberg et al. | | |
| 6,433,801 B1 * | 8/2002 | Moon et al. | .................... | 715/840 |
| 7,158,123 B2 * | 1/2007 | Myers et al. | ................. | 345/173 |
| 7,216,301 B2 * | 5/2007 | Moehrle | ........................ | 715/811 |
| 7,418,670 B2 * | 8/2008 | Goldsmith | ..................... | 715/810 |
| 7,454,706 B1 * | 11/2008 | Matthews et al. | ............. | 715/713 |
| 7,600,194 B2 * | 10/2009 | DeMaio et al. | ................ | 715/810 |
| 7,812,824 B2 * | 10/2010 | Im et al. | ......................... | 345/173 |
| 7,812,826 B2 * | 10/2010 | Ording et al. | .................. | 345/173 |
| 7,890,888 B2 * | 2/2011 | Glasgow et al. | ............. | 715/811 |
| 7,948,476 B2 * | 5/2011 | Goto et al. | ..................... | 345/173 |
| 2003/0081011 A1 | 5/2003 | Sheldon et al. | | |
| 2003/0084087 A1 | 5/2003 | Berry | | |
| 2006/0161871 A1 * | 7/2006 | Hotelling et al. | ............. | 715/863 |

FOREIGN PATENT DOCUMENTS

| | | |
|---|---|---|
| DE | 102005008171 A1 | 11/2005 |
| EP | 0517942 B1 | 3/1997 |
| EP | 0872994 A1 | 10/1998 |
| EP | 1406160 A2 | 4/2004 |
| WO | WO 2006048028 A1 | 5/2006 |

\* cited by examiner

Primary Examiner — K. Wong
(74) Attorney, Agent, or Firm — Buchanan Ingersoll & Rooney PC

(57) ABSTRACT

At least one additional menu layer can be selected in a menu layer and be displayed on a display unit by means of at least one control element. The additional menu layer selected via the control element is displayed in the display unit as a preview when an object approaches the control element that is equipped with a proximity sensor or when an object touches the control element that is fitted with a tactile sensor. The additional menu layer disappears again when the object, e.g. a person's finger, is removed, and the originally represented menu layer is automatically displayed again. This prevents the control elements from being repeatedly actuated, thus significantly increasing user friendliness and improving customer acceptance.

19 Claims, 2 Drawing Sheets

METHOD AND ARRANGEMENT FOR THE OPERATION OF ELECTRICAL DEVICES

CROSS REFERENCE TO RELATED APPLICATIONS

This application is the US National Stage of International Application No. PCT/EP2007/057618, filed Jul. 24, 2007 and claims the benefit thereof. The International Application claims the benefits of German application No. 10 2006 034 415.4 DE filed Jul. 25, 2006, both of the applications are incorporated by reference herein in their entirety.

FIELD OF INVENTION

The present invention relates to a method and arrangement for the operation of electrical devices.

BACKGROUND OF INVENTION

Different control elements such as keys, switches and also touchpads or touchscreens are already known for the operation of electrical devices, especially telecommunications or communication technology devices.

An arrangement of key elements is known from EP 0 517 942 B1 for example, with the aid of which in communication terminals, especially telephones, the functions of the communication terminal shown in the display unit can be selected or scrolled to depending on the respective switching state functions and can subsequently be initiated by actuating a follow-up key or actuation key.

SUMMARY OF INVENTION

If in an electrical device a number of functions or items of information represented by menus and the menu levels or sublevels are to be selected and operated, then with a restricted display scope of a display unit such as a display in a communication terminal for example, not all information in the context of the function to be operated can be clearly displayed, with a display being selected with many functions crowded together or with few functions, depending on the application.

In order to produce easy-to-understand displays even with a number of functions or items of information, the basic functions are displayed in a menu and the functions assigned to the basic functions are displayed in further menu levels or sublevels or pull-down menus or context-sensitive menus. In this case however a decision has to be made as to the menu levels or pull-down or context-sensitive menus in which the assigned function could be found. After a decision has been made by actuating the assigned control element, for example a key, the corresponding submenu with the assigned functions or information is displayed. Since the assignment of functions or information to the basic functions is frequently not clear, this frequently results in incorrect decisions or incorrect operation and it is necessary to actuate the control element in the root or base menu or to return to the previous menu level and make a new decision, which however can again be a wrong decision.

The object underlying the invention consists of improving the display of menus and further menu levels. The object is achieved based on a method and arrangement for operating electrical devices in accordance the independent claims.

An important aspect of the inventive method is to be seen in the fact that, when an object—especially a person's finger—approaches the control element equipped with a proximity sensor or and object touches the control element equipped with a touch sensor, the further menu level selected by the control element is shown in the display as a preview.

A significant advantage of the inventive method is to be seen in the fact that the functions or menus selected by a control element or further menu levels or sublevels are not selected and shown immediately but a preview of the functions or menus or submenus is shown by a proximity sensor or a touch sensor, which on removal of an object, for example a person's finger, disappears again and the menu or submenu originally shown automatically reappears. This avoids a tedious multiple actuation of the control elements or making a number of wrong decisions, which significantly enhances operating convenience and improves customer acceptance for electrical devices. The preview of the assigned function for the further menu levels or sublevels enables these to be divided up more simply on a number of levels and to be presented clearly.

A significant inventive development is to be seen in the fact that the further menu level able to be selected by the control element is displayed as a preview in reduced form in respect of format and/or content. This allows the major functions or just the frequently used functions or major functions of the sublevel depending on call processing or operating states to be displayed as a preview.

Further advantageous embodiments of the invention are related to the implementation of the proximity or touch sensors. According to one variant, with a proximity sensor (NSO) comprising at least one optical transmitter/receiver unit or an ultrasound transmitter/receiver unit, an optical signal sent out by the optical transmitter unit or an ultrasound signal sent out by the ultrasound transmitter unit, when an object (F) approaches the transmitter/receiver unit, detects the reflected optical signal or ultrasound signal in the receiver and a further menu level (WM) is selected by the detection. According to a further variant, with a capacitive proximity sensor, the approach of an object influences an oscillator vibration and the influencing is detected and a further menu level assigned to the respective control element is selected. In principle all proximity sensors can be used with the invention, in which case said sensors should be able to be integrated into control elements such as keys for example.

Advantageous developments of the inventive method as well as an arrangement for operating an electrical device with further embodiments are to be found in the dependent claims.

BRIEF DESCRIPTION OF THE DRAWINGS

The invention is explained in greater detail below with reference to three drawings. The figures show FIG. 1 an electrical device with the components of significance for the invention, FIG. 2 a flowchart of the inventive method and FIG. 3 an example of the information and functions displayed with the inventive method in a display unit of a telephone.

DETAILED DESCRIPTION OF INVENTION

Figure 1:
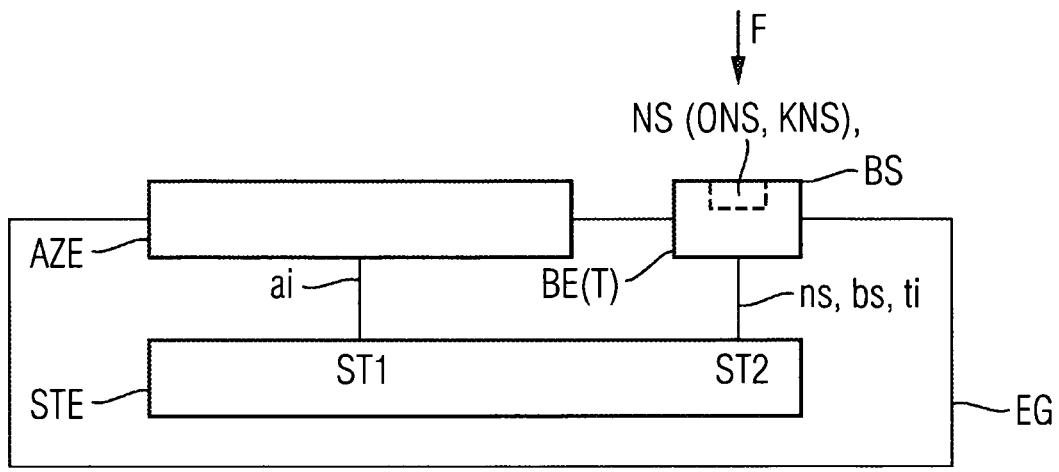

FIG. 1 shows a schematic diagram of an electrical device EG, in which only the arrangement of the components realizing the inventive method is shown, with only one control element BE from generally a number control elements of an electrical device being shown. The components shown are a display unit AZE, a control element BE as well as a control unit STE, with the control element BE and the display unit AE being connected to the control unit STE.

The display unit AZE is frequently implemented by an LCD display unit and is intended for the display of menu levels and further menu levels or sublevels. The menu levels are assigned initiatable functions and/or entered information. Alternatively the display unit AZE can be implemented by cost-effective organic light emitting diode displays or OLED displays for short. Implementation with electronic paper with e-ink technology is alternately possible, with a wide angle of view being able to be achieved with this method.

The control element BE is for example implemented by a mechanical key T, but other implementations such as electronic keys or touchscreen keys are possible. Inventively the control element BE or the key T is equipped in one inventive embodiment with a proximity sensor NS.

Different realization variants are possible as proximity sensor NS. In accordance with a first variant the control element BE or the key T is equipped with an optical proximity sensor ONS, with the optical proximity sensor ONS being implemented by an optical transceiver unit—indicated in FIG. 1 by a dashed-line rectangle. Such an optical transceiver unit is for example implemented through an optical infrared transmitter/receiver unit, with the optical transmitter unit for example sending out an infrared signal and the optical receiver unit for example at the approach of a person's finger F receiving the reflected proportion of the transmitted infrared signal. To facilitate the reflection and reception of the transmitted infrared signal, the transmitter and receiver unit is arranged such that the infrared signal is sent out and received at an angle to the operating side of the control element—not shown. The optical transmitter/receiver unit is arranged in a recess of the control element BE or the key T such that the infrared signal is sent out in the direction of the operating side of the control element BE.

If a signal level of a reflected received optical infrared signal is reached or exceeded, a proximity signal ns is formed and transmitted to the control unit STE. Ultrasound technology can be used as a further sensor technology, with the mode of operation being similar to optical sensor technology, but with an ultrasound signal being used instead of the optical signal—not shown.

In accordance with a further variant the control element BE or the key T is equipped with a capacitive proximity sensor KNS in which an oscillator vibration is influenced by the approach of a person's finger for example. This is brought about by the approaching object or the finger F changing the capacitance effective in the oscillator and thus changing the frequency of the vibrations created in the oscillator. The change in the frequency is detected and with a predetermined frequency change or a predetermined approach of an object or of the finger F a proximity signal ns is created and transmitted to the control unit STE—indicated in FIG. 1 by a line labeled ns.

In accordance with a further variant of the invention the control element BE or the key T can also be equipped with a touch sensor embodied as a resistive or capacitive touch screen, whereby, when the touch screen is touched by objects, for example by a person's finger, the touch is detected and a touch signal bs is transmitted to the control unit STE—indicated in FIG. 1 by a line labeled bs.

With the mechanical key T or the control unit BE mechanical actuation forms a key signal ti and this is likewise sent to the control unit STE. The key signal ti can be transmitted over a separate connection or over a common connection together with the proximity signal ns or touch signal bs.

The control unit STE is advantageously formed by a microprocessor system with a program memory and for example with two interfaces ST1, ST2 for the connection of the control unit BE and the display unit AZE. A common serial or parallel interface in processor systems can also be used—not shown. The inventive method is controlled in the control unit STE, i.e. depending on the signal transmitted by the control element BE ns, bs, ti, the display unit AZE is controlled or display signals as are formed and transmitted to the display unit AZE and displayed there.

Figure 2:
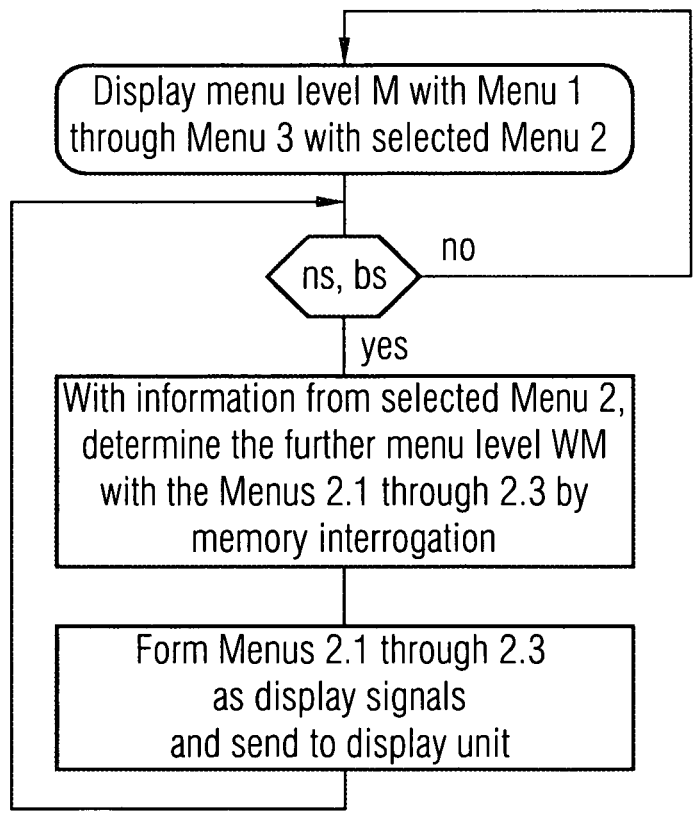

The method implemented in the control unit STE by program or software will be explained in greater detail with reference to the flowchart shown in FIG. 2 and for an electrical device EG realized as a terminal of a communication network—see also FIG. 3.

Figure 3:
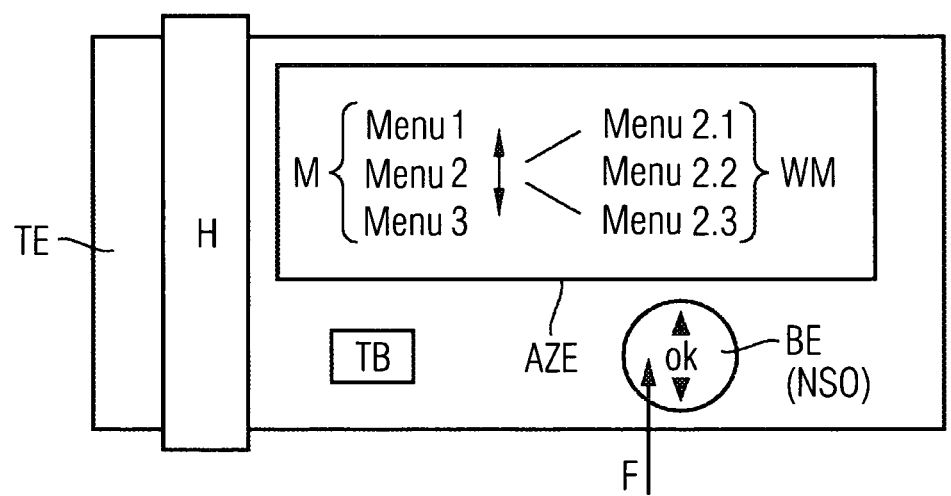

In this case the terminal in FIG. 3 represents a telephone TE which has the usual arrangement of a handset H, a keypad TB and a display unit AZE. The telephone TE is additionally equipped with an inventive control unit BE as well as the keypad TB. The keys of the keypad TB serve especially for telephone number entry or entering an address for a connection setup to a further terminal over a communication network, for example the telephone network or the Internet—not shown. The display unit AZE is usually implemented by an LCD display unit and is intended for displaying the entered information and also for a display of additional information and functions.

The display element AZE can also be implemented with the aid of other display technologies such as for example segmented, luminescing foils or LCD displays, with the display unit AZE being designed to enable menus and menu levels or sublevels to be displayed. A menu or a menu level is mostly formed by a number of items of information each of which is displayed in one line. The information is for example information assigned to functions or information representing functions which are displayed and from which one is selected for further processing in an electrical device GE.

The control unit BE is for example realized by a combination of keys, with two keys being provided for scrolling in menus displayed on the display unit AZE—indicated by two arrows in FIG. 3 which show the scrolling direction. On actuation of the third key the menu or menu levels selected with the scroll keys is activated or the next or further menu level are displayed—indicated in FIG. 3 by the label ok. The three keys are actuated via a circular cover on which the two arrows and the label ok are printed over the keys. By pressing on an area of the cover on which the two arrows are arranged, one of the two keys is actuated and through a generated key signal with the aid of the control unit STE a cursor not shown in the figure is controlled from a menu level to a further menu level and this shows which of the menu levels is currently selected—indicated in FIG. 3 by a double-ended arrow in the display unit AZE. By pressing on the area of the cover with the label ok the menu selected with the cursor is activated. The activation can cause a function to be initiated and/or a further menu level or menu sublevel to be displayed.

The keys can be implemented both mechanically and electronically or through touch screen keys. Furthermore the control unit BE, as shown and explained in FIG. 1, is inventively for example equipped with an optical proximity sensor NSO or integrated into the control unit BE—shown in FIG. 3 by the label BE (NSO).

It is assumed for the exemplary embodiment that a menu level (M) with three menus Menu M1 . . . Menu M3 is shown in the display unit AZE with the aid of the control unit STE. The three menus can for example be represented by three call processing functions such as call diversion, last number radial and callback. A person selects an assigned menu level or menu sublevel from Menu1 to Menu3, with the selection being made by actuating the keys controlling the cursor. For the exemplary embodiment it is assumed that the menu Menu2 is selected—see FIGS. 2 and 3. Inventively on the approach of an object, in the exemplary embodiment a person's finger F, to the control element BE, the method in accordance with the invention is initiated—indicated in FIG. 3 by an arrow labeled F.

With an optical proximity sensor NSO, for an optical signal reflected by the finger, if a predetermined receive signal level is exceeded, a proximity signal ns is formed and transmitted to the control unit STE. Since the menu Menu2 is currently selected—for example call diversion—the further or assigned menu level WM with the three sublevels Menu2.1 . . . Menü3 will be determined by the control unit STE and corresponding display information ai formed and transmitted to the display unit AZE—see FIG. 1. In the display unit AZE the further menu level WM is shown as a preview, i.e. the further menu level WM is displayed for as long as the finger F is located in the proximity area of the optical proximity sensor NSO—indicated in FIG. 3 by the labels Menu2.1, Menu2,2 and Menu2.3. If the finger F is moved again out of the proximity area of the optical proximity sensor NSO the original menu level M with the menus Menu1 . . . Menu3 is displayed again—see FIG. 2. After this another menu Menu1 . . . Menu3 can be selected immediately—not shown. If the further menu level WM displayed as a preview is to be permanently displayed, the key labeled ok is pressed with the finger.

Alternately the further menu level WM can be displayed as a preview in addition to the current menu level M with the menus Menu1 . . . Menu3, provided the display unit AZE is dimensioned for this purpose. Advantageously in this case the information as a preview of the further menu level WM is to be displayed in a reduced form in respect of its format and content. As regards format the information can be reduced in size or shown in shortened form. The content of the further menu level WM can for example be reduced by only keywords or abbreviations being specified.

The inventive method or arrangement can be used not just in telecommunications or communication technology devices, but can be employed in all electrical appliances or devices in which menu sublevels or function sublevels or information sublevels can be displayed. The components relevant to the invention are in this case to be adapted to the respective menus and further menu levels or menu sublevels.

The invention claimed is:

1. A method for operating a terminal device having a control unit and an input mechanism comprised of a control element, the method comprising:
    a display unit of the terminal device displaying a first menu level having a plurality of menus that each represent a different function for the terminal device;
    selecting a first menu of the menus of the first menu level;
    a proximity sensor located in the control element of the terminal device detecting whether an object is within a predefined proximity area of the proximity sensor;
    the proximity sensor transmitting a proximity signal to a control unit of the terminal device if the object is within the predefined proximity area while the first menu is selected;
    the control unit determining a second menu level that is to be displayed at the display unit if the first menu is activated, the second menu level comprising second menus each representing different information about the function represented by the first menu that is displayable after the first menu is activated;
    the display unit displaying the second menu level as long as the object is within the predefined proximity area of the proximity sensor.

2. The method of claim 1 further comprising the control unit receiving input for activating the selected first menu and the display unit displaying the second menu level and no longer displaying the first menu level.

3. The method of claim 1 wherein the proximity sensor comprises one of an optical transmitter/receiver unit, an ultrasound transmitter/receiver unit, and a capacitive proximity sensor.

4. The method of claim 1 wherein the terminal device is a telephone.

5. The method of claim 1 wherein the first menus of the first menu level each represent different call processing functions selected from the group consisting of call diversion, last number redial, and callback.

6. The method of claim 1 wherein the display unit displaying the second menu level comprises the display unit displaying the second menu level as a preview of the second menu level while also displaying the first menu level.

7. The method of claim 6 wherein the preview of the second menu level comprises a display of at least one of format and content of the second menu level in a reduced form.

8. The method of claim 7 wherein the reduced form of the second menu level comprises at least one of the second menus representing a major function, a frequently used function or a combination of the major function and frequently used function of the second menu level.

9. The method of claim 1 wherein the second menu level is a sublevel menu of the first menu level.

10. An electronic device comprising:
    a control element having a proximity sensor;
    a display unit; and
    a control unit connected to the control element and the display unit; and
    the display unit displaying a first menu level having a plurality of menus that each represents a different function for the electronic device;
    the proximity sensor of the control element detecting whether an object is within a predefined proximity area of the proximity sensor;
    the proximity sensor transmitting a proximity signal to the control unit if the object is detected within the predefined proximity area while a first menu of the menus of the first menu level is selected;
    the control unit determining a second menu level that is to be displayed at the display unit if the first menu is activated, the second menu level comprising second menus each representing different information about the function represented by the first menu that is displayable after the first menu is activated;
    the display unit displaying the second menu level as long as the object is within the predefined proximity area of the proximity sensor.

11. The electronic device of claim 10 wherein the object providing an input at the proximity sensor, the object being a finger of a user of the electronic device, and the input provided by the object being a touch in the predefined proximity area of the proximity sensor.

12. The electronic device of claim 10 wherein the control unit receiving input for activating the selected first menu and the display unit displaying the second menu level and no longer displaying the first menu level.

13. The electronic device of claim 10 wherein the control element is a mechanical key or a touch screen of a telephone.

14. The electronic device of claim 10 the control element comprises a combination of three keys, a first key of the combination performing a first scrolling function in a first direction, a second key of the combination performing a second scrolling function in a second direction, and a third key of the combination performing an activation function.

15. The electronic device of claim 10 wherein the display unit displays the second menu level as a preview of the second menu level while also displaying the first menu level.

16. The electronic device of claim 15 wherein the preview of the second menu level is a reduced form of the second menu level and second menu level information being presented as at least one of specified keywords and specified abbreviations.

17. The electronic device of claim 10 wherein the display unit displaying the second menu level as long as the object is within the predefined proximity area of the proximity sensor such that the first menu level is not displayed by the display unit when the second menu level is displayed and wherein the display unit displaying the first menu level and no longer displaying the second menu level when the object moves out of the predefined proximity area of the proximity sensor of the control element.

18. The method of claim 1 wherein the control element is a mechanical key element and the control unit is comprised of a microprocessor system.

19. The method of claim 1 wherein the display unit displaying the second menu level as long as the object is within the predefined proximity area of the proximity sensor occurs such that the first menu level is not displayed by the display unit when the second menu level is displayed and wherein the method further comprising the display unit displaying the first menu level and no longer displaying the second menu level when the object moves out of the predefined proximity area of the proximity sensor of the control element.

\* \* \* \* \*